(12) United States Patent
Torvinen (10) Patent No.: US 7,684,688 B2
(45) Date of Patent: Mar. 23, 2010

(54) ADJUSTABLE DEPTH OF FIELD

(75) Inventor: Marko Torvinen, Tampere (FI)

(73) Assignee: Nokia Corporation, Espoo (FI)

( * ) Notice: Subject to any disclaimer, the term of this patent is extended or adjusted under 35 U.S.C. 154(b) by 826 days.

(21) Appl. No.: 11/384,987

(22) Filed: Mar. 20, 2006

(65) Prior Publication Data

US 2007/0217776 A1   Sep. 20, 2007

(51) Int. Cl.
 *G03B 13/18* (2006.01)
 *G03B 3/00* (2006.01)
(52) U.S. Cl. .................... 396/89; 348/345; 348/E5.045
(58) Field of Classification Search .................... 396/89
 See application file for complete search history.

(56) References Cited

U.S. PATENT DOCUMENTS 5,621,495 A * 4/1997 Yamamoto et al. ............ 396/89
6,308,015 B1 * 10/2001 Matsumoto .................... 396/89
7,221,863 B2 * 5/2007 Kondo et al. .................... 396/5
7,412,158 B2 * 8/2008 Kakkori ........................ 396/89

* cited by examiner

*Primary Examiner*—Jay M Patidar
(74) *Attorney, Agent, or Firm*—Foley & Lardner, LLP (57) ABSTRACT

A camera having a depth of field which can be modified to produce desired photographic effects. The camera determines the depth of field for a subject when the subject is focused upon. A modification to the depth of field is determined based upon the distance to the subject, and the depth of field is modified to produce the desired photographic effect. In one embodiment, the depth of field is reduced, while, in another embodiment, the depth of field is shifted to place the subject slightly out of focus and to alter the focus of the background.

25 Claims, 6 Drawing Sheets

ADJUSTABLE DEPTH OF FIELD

FIELD OF THE INVENTION

The present invention relates generally to electronic devices having camera functionality. More particularly, the present invention relates to digital cameras having an adjustable depth of field.

BACKGROUND OF THE INVENTION

Cameras are widely used by average consumers, hobbyists, and professionals. While film-based photography has been popular for decades, digital cameras are quickly becoming the principal photography device for most households. Indeed, many electronic devices are being integrated with digital camera functionality, and traditional film cameras are being fitted with electronic features as well. For example, mobile telephones which include a digital camera are becoming increasingly common.

A well known photographic method involves utilizing a different depth of field ("DOF") to produce an image with the subject slightly out of focus, which is sometimes called "soft-focus" or portrait-style. Depth of field is the distance between the farthest and nearest points which are in focus. This can also be identified as the zone of acceptable sharpness in front of and behind the subject, to which the lens is focused on. While "acceptably sharp" is a somewhat subjective standard, it has been defined mathematically by those skilled in the art. In general, the suggested photographic procedure is to place ⅓ of the DOF in front of the subject and ⅔ behind the subject.

The DOF is determined from several variables and is a function of the size of the image capturing device (i.e. film or photoelectric sensor), aperture, focal length, and distance to the subject. In portrait photography, it is common to utilize a shallow DOF in order to place the subject in sharper contrast to the surroundings.

Film-based cameras have utilized various methods such as special lenses, filters, or even gels to achieve a shallower DOF. However, since DOF is inversely proportional to the size of the image capturing device, film-based cameras have traditionally had much greater control over DOF than digital cameras, due at least in part to the relative large size of film in comparison to photoelectric sensors used in digital cameras. Thus, the relatively small size of the image capturing device used in digital cameras has traditionally resulted in a large DOF. Therefore, there is a need for a method and apparatus to allow for a shallower DOF, such that a user can employ various photographic techniques such as portrait photography.

SUMMARY OF THE INVENTION

The present invention relates to a camera having a depth of field which is modifiable to produce a desired image of a subject. In one embodiment, a user selects to either take photographs as normal or in a "modify depth of field" mode. In the modify depth of field mode, the user focuses the camera on a subject. The camera determines the distance to the subject. The necessary modification to the camera to produce the desired modification to the depth of field is determined, in one embodiment, through the use of look-up-tables.

In one embodiment, the change is a shifting of the depth of field in relation to the subject by refocusing the camera at a point in front of the subject. In another embodiment, the change is a shrinking of the depth of field to place the foreground and background less in focus than under the normal depth of field.

These and other objects, advantages, and features of the invention, together with the organization and manner of operation thereof, will become apparent from the following detailed description when taken in conjunction with the accompanying drawings, wherein like elements have like numerals throughout the several drawings described below.

DETAILED DESCRIPTION OF THE PREFERRED EMBODIMENTS

The present invention relates to methods and apparatus for reducing the DOF of a camera. A generic digital camera constructed according to one embodiment of the present invention is shown at 10 in FIG. 1. The digital camera 10 can be a stand-alone device or can be incorporated into another electronic device, such as a portable telephone. The digital camera 10 includes a housing 11 which contains a shutter 13 covering at least one lens 12, the shutter 13 serving to control the length of the exposure. An aperture 15 is located between the shutter 13 and lens 12 for controlling the amount of light. Also included is a primary memory unit 14, a camera processor 16, and at least one image sensor 18. The primary memory unit 14 can be used to store digital images and computer software for performing various functions in the digital camera 10, as well as to implement the present invention. In one embodiment, a removable, secondary memory unit 20, in the form of a memory card, can also be included in the digital camera 10 to provide extra memory space. In one embodiment, the image sensor 18 can be a charge coupled device (CCD), a complementary metal oxide semiconductor (CMOS), or another system as known in the art. The digital camera 10 also includes a user interface 26, such as, in one embodiment, one or more input buttons, a graphical user interface, or a combination thereof, for entering information and/or taking a picture. In one embodiment, a DOF adjustment mode selector (not shown) is provided either separately or as part of the user interface 26.

Figure 1:
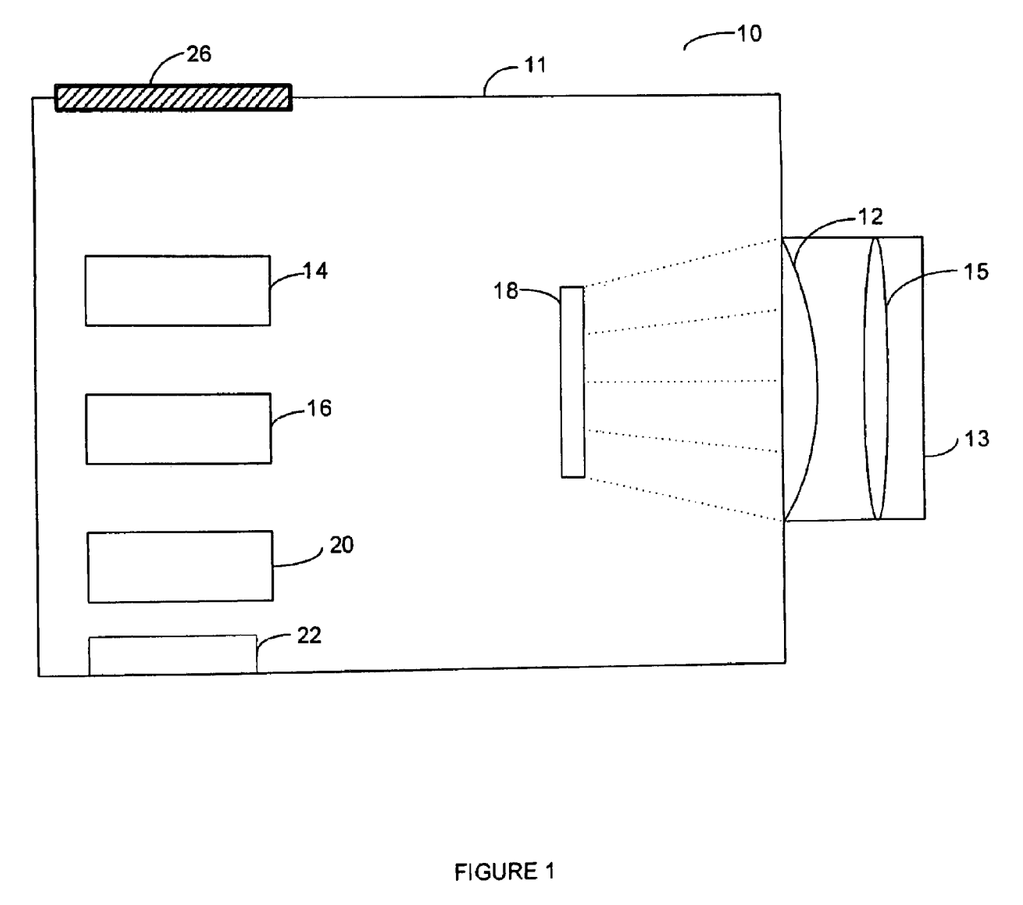
FIG. 1 is a sectional side view of a generic digital camera constructed according to the principles of the present invention.

When a digital file capturing an image or subject 605 is created, the at least one lens 12 focuses the image 605 onto the at least one image sensor 18 which electronically records light reflected from the image 605. The camera processor 16 then breaks this electronic information down into digital data (via an analog-to-digital conversion) for a digital image which can be stored on a memory unit, such as the primary memory unit 14 and/or the secondary memory unit 20, as a file. The digital camera 10 also includes a data communication port 22 to enable the transmission of digital images from the digital camera 10 to a remote terminal, such as a personal computer. The data communication can be in either wired or wireless form and can be configured for USB, Bluetooth, infrared, or other connections.

The digital camera of the present may be one component of another device such as a video camera, a mobile telephone, a personal digital assistant, a watch, or an audio player. When the digital camera is a component of another device, various parts may be common to the devices. For example, in one embodiment of the present invention, a mobile telephone includes a digital camera component and a telephone component, both of which may share a housing, memory, processor, etc.

Figure 2:
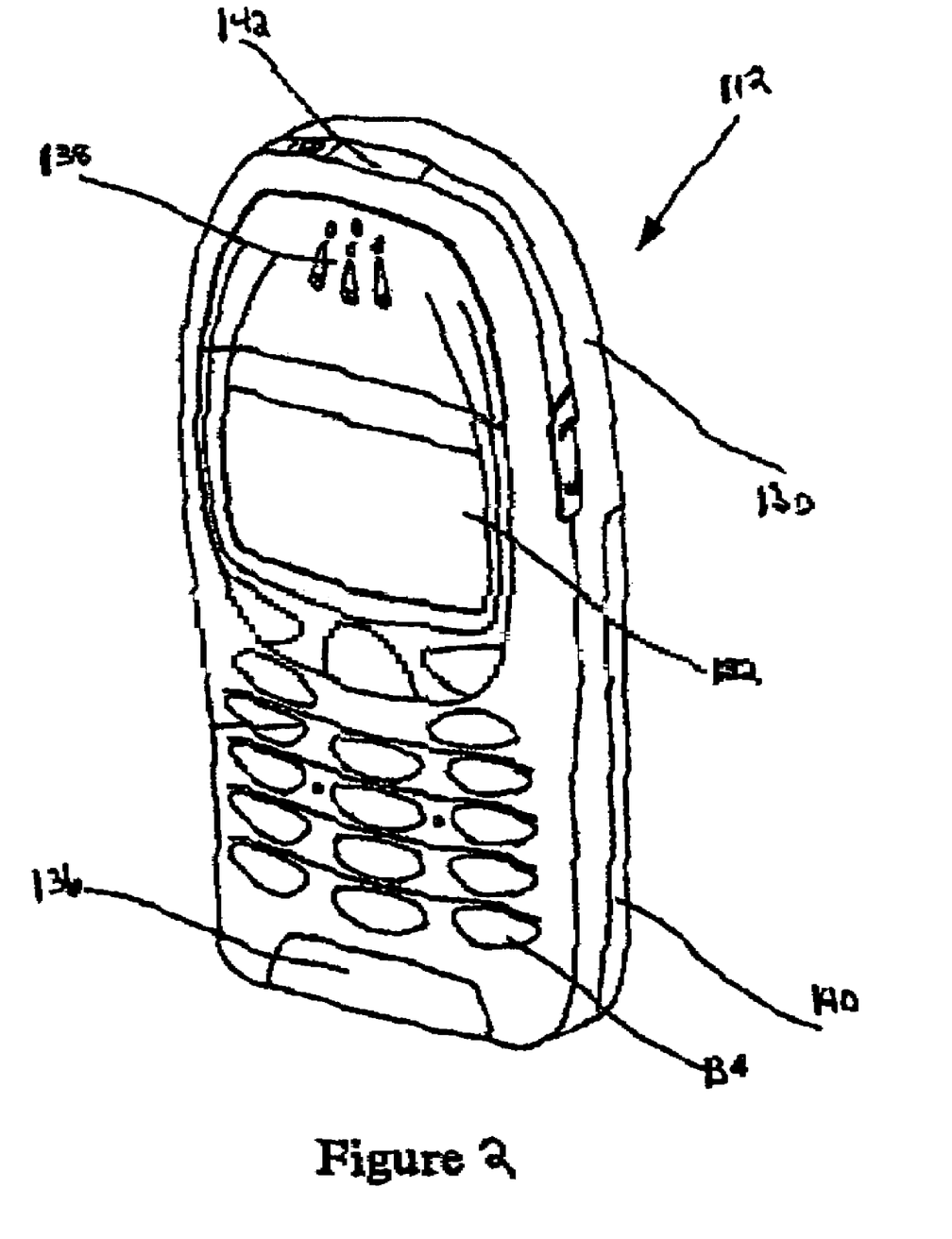
FIG. 2 is a perspective view of a mobile telephone that can be used in the implementation of the present invention.
Figure 3:
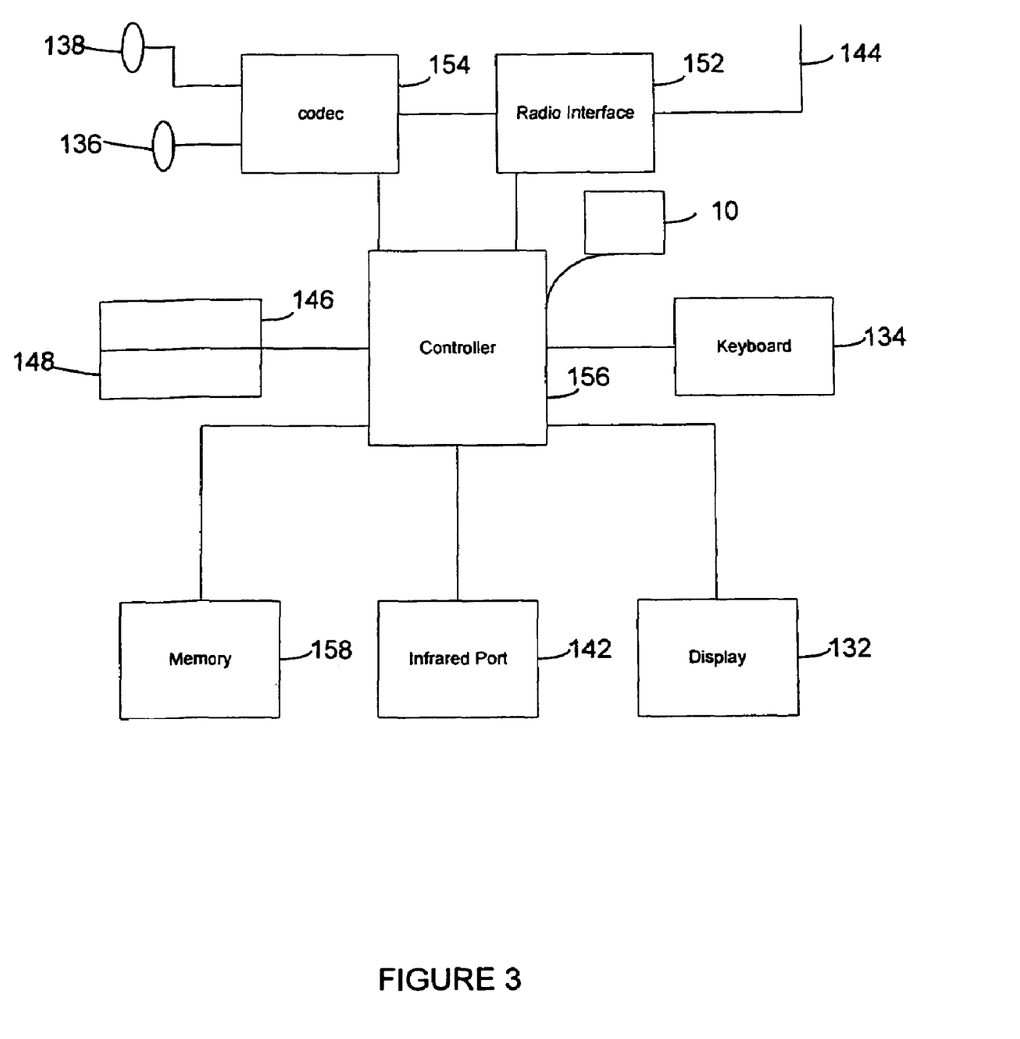
FIG. 3 is a schematic representation of the telephone circuitry of the mobile telephone of FIG. 2.

FIGS. 2 and 3 show one representative mobile telephone 112 within which the present invention may be implemented. It should be understood, however, that the present invention is not intended to be limited to one particular type of mobile telephone 112 or other electronic device. FIG. 2 depicts a mobile telephone having digital camera functionality in accordance with the principles of the present invention. The mobile telephone 112 of FIG. 2 includes a housing 130, a display 132 in the form of a liquid crystal display (LCD), a keypad 134, a microphone 136, an ear-piece 138, a battery 140, an infrared port 142, an antenna 144, a smart card 146, in the form of a universal integrated circuit card (UICC) according to one embodiment of the invention, a card reader 148, radio interface circuitry 152, codec circuitry 154, a controller 156 and a memory 158. It should be noted that the controller 156 can be the same unit or a different unit than the camera processor 16. Individual circuits and elements are all of a type well known in the art, for example in the Nokia range of mobile telephones. Other types of electronic devices within which the present invention may be incorporated can include, but are not limited to, personal digital assistants (PDAs), integrated messaging devices (IMDs), desktop computers, and notebook computers. FIG. 3 illustrates a schematic of the components of the mobile phone 112 of FIG. 2.

Figure 4:
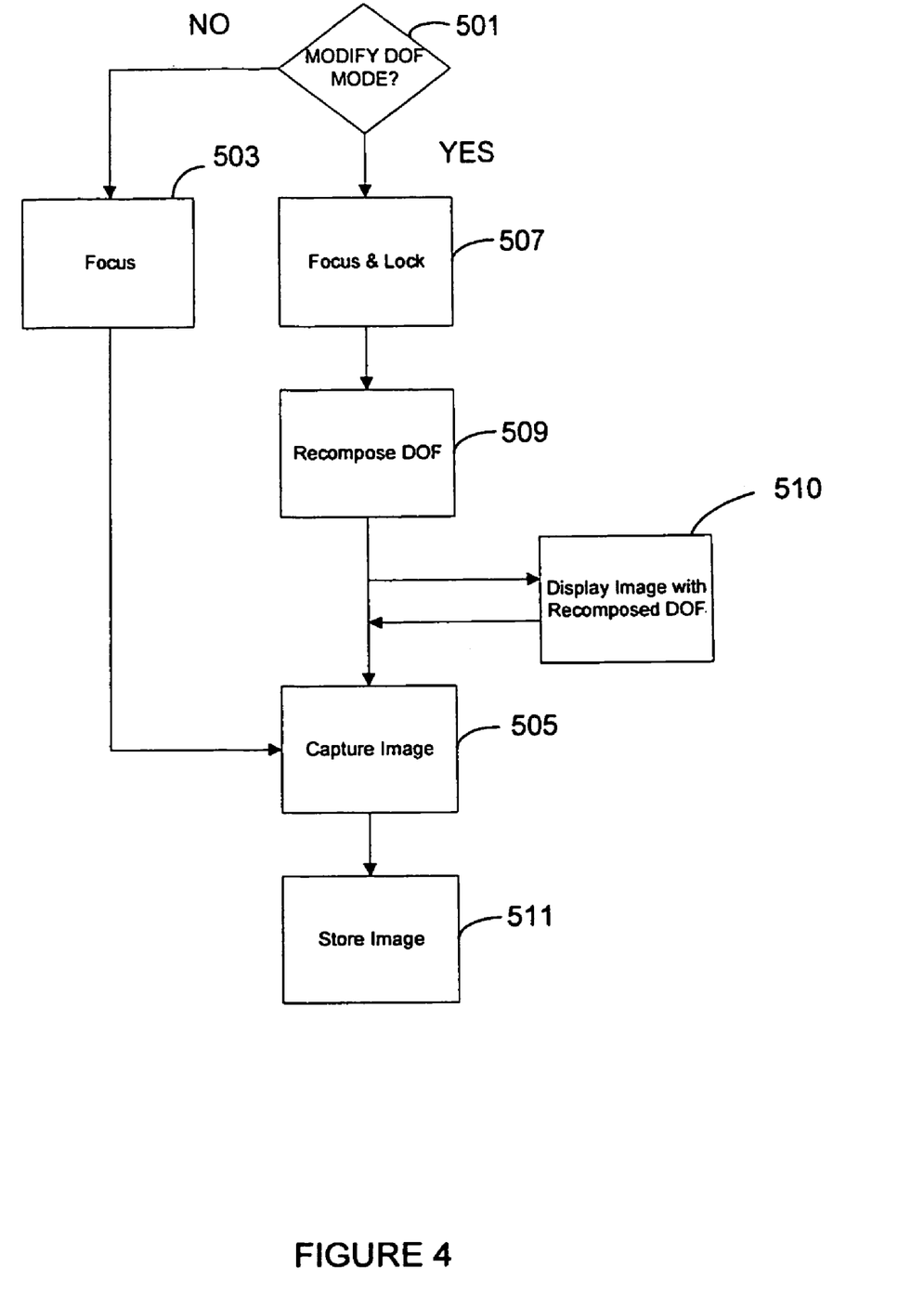
FIG. 4 is a flow diagram showing a generic process for the implementation of the present invention.

FIG. 4 is a flow chart showing the operation of one embodiment of the implementation of the present invention. Initially, a determination of whether the camera is in "modify DOF mode" is made at step 501. If the camera is not in modify DOF mode, the camera proceeds to function as a typical prior art camera would by focusing the lens at step 503 and capturing the image at step 505. No determination or modification of DOF occurs. In the event the camera is in modify DOF mode, then the camera focuses and locks the focus at step 507. The camera modifies the DOF at step 509, for example in one embodiment by creating a shallower DOF or in another embodiment by altering the focus point of the camera to move the subject within the DOF. This step is explained in detail below regarding FIG. 5. Once the DOF has been modified in step 509, the camera captures the image at step 505. However, in one embodiment, a user is able to see a display of the image with the recomposed DOF at step 510 prior to capturing the image. The captured image may then be processed and stored in the secondary memory unit 20 at step 511 as is known in the prior art.

Figure 5:
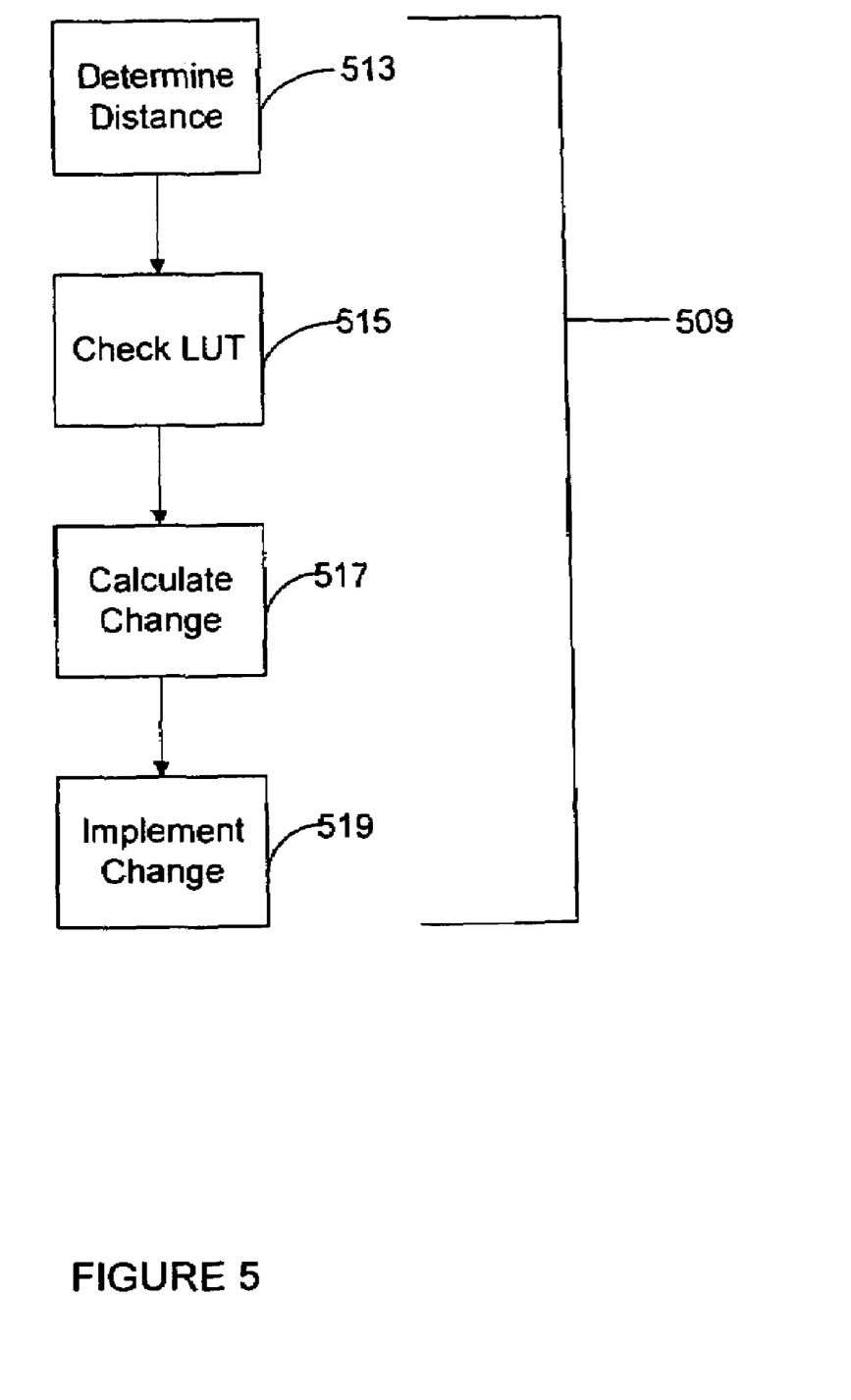
FIG. 5 is a flow diagram showing a process utilized by one embodiment for modifying the depth of field.

One embodiment of modifying the DOF, is further illustrated in FIG. 5. Once the camera has focused on the subject (step 507 in FIG. 4, the distance to the subject is determined in step 513. This can be accomplished by any of the various mechanism known to one skilled in the art, such as audio mechanisms (including radio and sound) and light reflective mechanisms (including lasers). Once the distance has been determined in step 513, the distance is used, in combination with the current state of the camera in regard to DOF, i.e. aperture, sensor size, focal length, etc., to determine the appropriate adjustments to make to the camera state to have the desired affect on the DOF. For example, in one embodiment, this can be accomplished at step 515 by accessing a look-up-table ("LUT") which contains information regarding changes necessary to achieve a specific DOF. The distance to the subject can also be determined using the position sensors in the lens system. In one embodiment, the distance value is stored in EXIF data to allow a user to be able to check what the distance was to the subject. The changes can either selected by a user or a default DOF for use in the DOF modification mode. In one exemplary embodiment, the LUT contains information regarding the position of the lens for use during the modify DOF mode. For example, where the modify DOF mode is set to result in portrait type photographs, the LUT can be accessed for information regarding focusing the lens in front of the subject. As it is generally accepted in the photographic arts that a viewer is more distracted from a subject when the background is in focus than when the foreground is in focus, focusing the camera in front of the subject effectively moves the subject back in the DOF, resulting in more the background being out of focus than if the camera had focused on the subject. In one embodiment, the LUT is stored in the primary memory unit 14. The necessary change to implement the new DOF is determined in step 517. At step 519, the changes determined to be necessary to implement the new DOF are implemented. For example, the camera can refocus using the new lens positions determined when the LUT was accessed at this step.

Figure 6A:
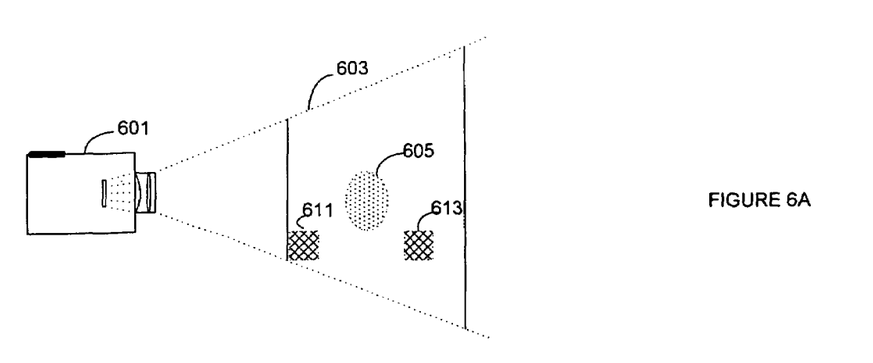
FIG. 6A is an illustration the standard depth of field.
Figure 6B:
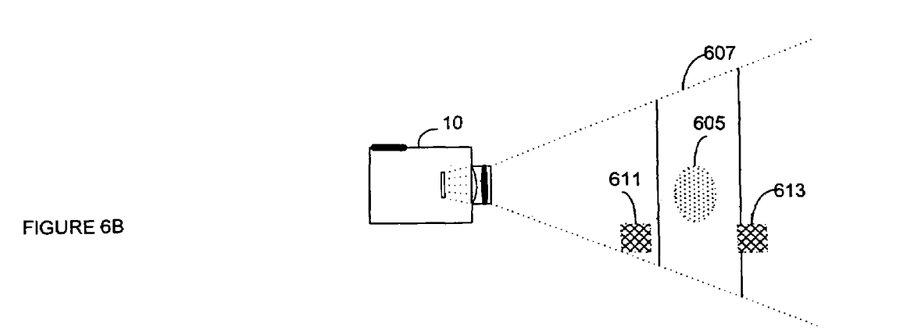
FIG. 6B is an illustration of a reduced or shallow depth of field in accordance with the principles of the present invention.
Figure 6C:
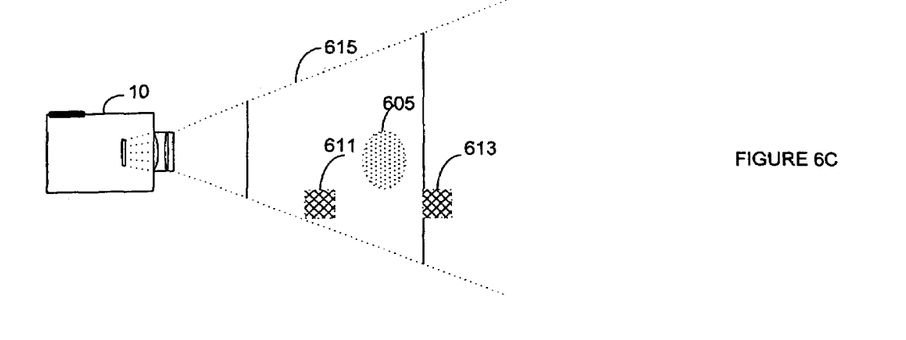
FIG. 6C is an illustration of a shifted depth of field in accordance with the principles of the present invention.

FIGS. 6B-6C illustrates two different embodiments for modifying the depth of field. FIG. 6A represents a standard prior art camera 601 with a default depth of field 603 with the camera 601 focused on a subject 605 with a foreground object 611 and a background object 613, both within the field of depth 603. FIG. 6B illustrates the changed depth of field 607 of the camera 10 of one embodiment of the present invention where the depth of field is reduced or made shallow. The foreground object 611 and the background object 613 are now both outside of the depth of field 607, meaning they will be more out of focus than the subject 605. FIG. 6C illustrates the changed the depth of field of the camera 10 in another embodiment of the present invention where -the depth of field 615 is shifted in relation to the subject 605. The foreground object 611 is still in the focus and is closer to the center of the depth of field 615. The subject 605 is shifted back within the depth of field 615, resulting in the subject not being in focus as in FIG. 6A. This is often a desirable feature-for portraits. In addition, while the foreground object 611 is still within the depth of field 615, the background object 613 is now outside of the depth of field 615, meaning it will be relatively out of focus, also a commonly desirable feature for portraits. In another embodiment, the change may consist of a combination of shifting and shrinking the depth of field.

In one embodiment, the user may reposition the camera to place the subject in the desired position within the modified depth of field. As mentioned previously, the general convention is for the subject to be ⅓ of the way from the front of the depth of field, but since the focus is locked, the user may position the subject anywhere without the camera refocusing.

While the present invention has primarily been described in the context of digital cameras, the invention can include the use of a film-based camera having the describe apparatus or using the described methods for altering depth of field.

The present invention is described in the general context of method steps, which may be implemented in one embodiment by a program product including computer-executable instructions, such as program code, executed by computers in networked environments.

Generally, program modules include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represent examples of corresponding acts for implementing the functions described in such steps.

Software and web implementations of the present invention could be accomplished with standard programming techniques, with rule based logic, and other logic to accomplish the various database searching steps, correlation steps, comparison steps and decision steps. It should also be noted that the words "component" and "module" as used herein, and in the claims, is intended to encompass implementations using one or more lines of software code, and/or hardware implementations, and/or equipment for receiving manual inputs.

The foregoing description of embodiments of the present invention have been presented for purposes of illustration and description. It is not intended to be exhaustive or to limit the present invention to the precise form disclosed, and modifications and variations are possible in light of the above teachings or may be acquired from practice of the present invention. The embodiments were chosen and described in order to explain the principles of the present invention and its practical application to enable one skilled in the art to utilize the present invention in various embodiments, and with various modifications, as are suited to the particular use contemplated.

What is claimed is:

1. A method for controlling depth of field of a camera comprising:
   a device configured to:
   ascertain a distance from the camera to a subject;
   automatically determine a change for modifying the depth of field with respect to the subject; and
   implement the determined change for modifying the depth of field,
   wherein the depth of field is modified as a result of the implemented change.

2. The method of claim 1, wherein the change comprises refocusing at a focus point other than the subject, wherein the depth of field moves with regard to the subject.

3. The method of claim 2, wherein the moving the focus point comprises placing the subject ⅓ from a front of the depth of field.

4. The method of claim 1, wherein the change comprises altering a size of the depth of field.

5. The method of claim 1, wherein the device is further configured to:
   determine whether the camera is in a "modify depth of field" mode; and
   determine and implement the change only if the camera is in the "modify depth of field" mode.

6. The method of claim 1, wherein the device is further configured to focus on the subject and subsequently ascertain the distance from the camera to the subject.

7. The method of claim 6, wherein the device is further configured to lock a lens position to prevent subsequent refocusing on the subject following the implementation of the change in the field of depth.

8. The method of claim 2, wherein the device is further configured to provide an image preview of the subject after the depth of field is modified.

9. The method of claim 1, wherein the automatic determination of the change involves the use of a look-up-table.

10. The method of claim 9, wherein the look-up table is stored in a memory unit.

11. The method of claim 1, wherein the distance associated with an image is determined using position sensors associated with a lens system.

12. The method of claim 11, wherein a value determined for the distance is stored in a memory unit.

13. A computer program product embodied on a computer-readable storage medium for controlling depth of field of a camera, comprising:
   computer code for determining the depth of field for a subject;
   computer code for determining via a look-up-table, which is stored in the computer-readable storage medium, a change for modifying the depth of field with respect to the subject; and
   computer code for implementing the determined change for modifying the depth of field.

14. The computer program product of claim 13, wherein the change comprises moving a focus point to a point other than the subject wherein the depth of field moves with regard to the subject.

15. The computer program product of claim 14, wherein the moving the focus point comprises placing the subject ⅓ from a front of the depth of field.

16. The computer program product of claim 13, further comprising computer code for determining whether the camera is in a "modify depth of field" mode, and wherein the determining and the implementing of the change occurs only if the camera is in the "modify depth of field" mode.

17. The computer program product of claim 13, wherein the change comprises altering a size of the depth of field.

18. The computer program product of claim 14, further comprising computer code for, prior to ascertaining a distance from the camera to the subject, focusing on the subject and computer code for locking a lens position to prevent subsequent refocusing on the subject following the implementation of the change in the field of depth.

19. The computer program product of claim 14, further comprising computer code for storing in the computer-readable storage medium the distance associated with an image.

20. An electronic device, comprising:
   a processor for processing information;
   a memory unit operatively connected to the processor; and
   a digital camera,
   wherein the memory unit includes:
   computer code for ascertaining a distance from the camera to a subject;
   computer code for determining via a look-up-table, which is stored in the memory unit, a change for modifying the depth of field with respect to the subject; and
   computer code for implementing the determined change for modifying the depth of field.

21. The electronic device of claim 20, wherein the electronic device includes a digital camera comprising part of a camera-phone.

22. The electronic device of claim 21, wherein the digital camera comprises a charge coupled device.

23. The electronic device of claim 21, wherein the memory unit further comprises computer code for refocusing at a point other than the subject wherein the depth of field moves with regard to the subject.

24. The electronic device of claim 21, wherein the memory unit further comprises computer code for altering a size of the depth of field.

25. The electronic device of claim 21, wherein the memory unit further comprises computer code for, prior to ascertaining the distance from the camera to the subject, focusing on the subject and computer code for locking a lens position to prevent subsequent refocusing on the subject following the implementation of the change in the field of depth.

* * * * *